Figure 1:
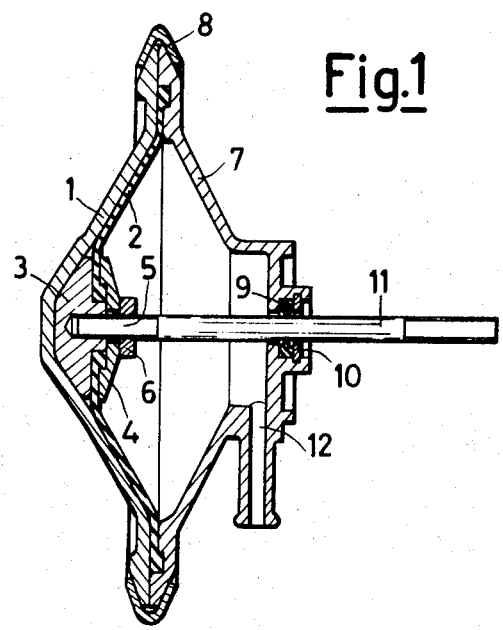

United States Patent [19]
Garcea

[11] 3,721,127
[45] March 20, 1973

[54] DIAPHRAGM DEVICE, SENSITIVE TO ABSOLUTE PRESSURES

[75] Inventor: Giampaolo Garcea, 18 Milan, Italy
[73] Assignee: Alfa Romeo S.p.A., Milan, Italy
[22] Filed: May 13, 1971
[21] Appl. No.: 143,003

[30] Foreign Application Priority Data

June 19, 1970  Italy ........................26302 A/70

[52] U.S. Cl..........................................73/406, 92/99
[51] Int. Cl................................................G01l 7/08
[58] Field of Search .....73/406, 410, 408; 92/99, 100

[56] References Cited

UNITED STATES PATENTS

| | | | |
|---|---|---|---|
| 3,143,043 | 8/1964 | Kinney | 92/100 X |
| 3,390,579 | 7/1968 | Glattenberg et al. | 73/410 |

Primary Examiner—Donald O. Woodiel
Attorney—Holman & Stern

[57] ABSTRACT

Device for measuring absolute pressures, of the pliable diaphragm type which cooperates with a capsule having rigid walls and containing the diaphragm. In the initial assembly stage, the diaphragm completely mates with the surface of either rigid wall of the capsule, so that virtually no air is sealed therebetween. On completion of the assembly, a preload is imparted to the diaphragm by means of an externally mounted spring, so that a vacuum is created between the diaphragm and the rigid wall confronting the diaphragm with the device being adapted not only to measure absolute pressures, but also to control servo devices in response thereto.

3 Claims, 2 Drawing Figures

PATENTED MAR 20 1973 3,721,127

DIAPHRAGM DEVICE, SENSITIVE TO ABSOLUTE PRESSURES

As is well known, cases frequently occur in the technique, in which a device, sensitive to the absolute pressure of a fluid, should give an indication of said pressure or carry out an adjustment as a function of the value of the pressure concerned.

It is also known that such devices, sensitive to the absolute pressure of a fluid, are generally embodied by utilizing a sealed capsule of metal sheet, whose interior cavity is evacuated. The thus evacuated capsule is immersed in the fluid whose absolute pressure is to be measured, or which is intended to effect a certain adjustment. On account of the resiliency of the capsule walls (to which the resiliency of an internal spring, placed in parallel, can be added), the capsule, as it is deformed, takes such a configuration for which the load due to the absolute pressure acting upon the outer walls is balanced by the elastic reaction as supplied by the capsule walls and, possibly also by the bias of the internal spring.

It is also known that devices, which are responsive to the relative pressure of a fluid, that is, to the differential between the absolute pressure of the fluid itself and another absolute pressure (which can be, for example, the ambient atmospheric pressure), are generally embodied, conversely, by resorting to a thin pliable diaphragm on whose opposite surfaces the two absolute pressures are active whereas a spring mounted at the side of the lower pressure provides the force which counteracts the load acting on the diaphragm due to the effect of the differential between the two absolute pressures.

It stems from the different modes of embodiment, that the devices responsive to a relative pressure, which resort to a pliable diaphragm, have considerable deformation strokes, and thus are enabled to supply a considerable work for an adjustment (a work which is a fraction of the overall deformation work), whereas the devices which are responsive to an absolute pressure, utilizing an evacuated metallic capsule, have much smaller deformation strokes and are generally capable of supplying a much lesser work for an adjustment. It is an object of the present invention to provide a device which is sensitive to the absolute pressure and utilizes a flexible diaphragm, and is thus capable of supplying a considerable work for an adjustment as a function of the absolute pressure aforementioned. Devices of this kind have not yet been embodied, partly because the advancements achieved in recent years in the field of the imperviousness to gases of thin diaphragms made of elastomers, especially butyl, have not been taken into due account heretofore, but, mainly, because the withdrawal of air to form the vacuum in the volume or space defined between a stiff or rigid wall and the thin elastomeric diaphragm is neither simple nor easy to carry out in mass production runs. The latter shortcoming is removed in the present device since the special design of the rigid wall and the diaphragm aforementioned are such as not to require any evacuation of air. This is because, with such a design, the diaphragm totally mates with the rigid wall during the preliminary assembling operation and so virtually no compressed air is present between the diaphragm and the rigid wall: by so doing, in the subsequent assembling operations of the device, (that is as the spring load is applied to the diaphragm) the latter is separated from the rigid wall and in the intermediate volume therebetween vacuum is created spontaneously. Since the pressure acting on the diaphragm surface facing the rigid wall is virtually zero, the diaphragm becomes responsive only to the magnitude of the absolute pressure of the fluid contacting the opposite face. The essential feature of the device according to this invention lies, as outlined above, in the fact that the diaphragm is caused completely to adhere to the rigid container at the initial assemblage operation, so that, in such a device, the spring should not be mounted between the diaphragm and the container (as would appear to be convenient on account of the direction of the thrust), otherwise this would involve the presence of air between the spirals of the springs and therearound. The presence of air would determine the existence of a non absolute degree of vacuum and thus the existence of a pressure other than zero on the surface of the diaphragm which confronts the rigid container wall. The necessity of transferring to the diaphragm the spring load, apparently involves the necessity of having the diaphragm surface extended about a stiff central element, to which the spring load is applied via the intermediary of a link.

The foregoing becomes quite clear with the aid of the accompanying drawings which are given by way of example only and without limitation, and wherein a possible embodiment of the device the subject of the present invention is illustrated.

Figure 2:
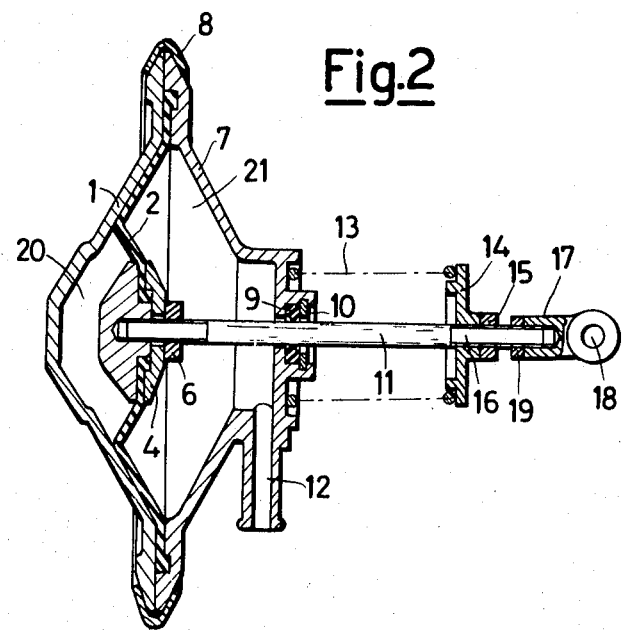

FIG. 1 is a cross-sectional view of a portion of the device, as seen in a stage of the assemblage operation, and FIG. 2 is a cross-sectional view of the entire device on completion of the assemblage operation.

In FIG. 1, numeral 1 indicates a rigid wall, and 2 is a diaphragm which extends about a central rigid element comprising a boss 3, a washer 4, a screw 5 and the nut 6. The nut 6 and a screw 5 clamp in a sealtight manner the inner edge of the diaphragm between the boss 3 and the washer 4. A second rigid wall 7 has its outer edge clamped by a retaining ring 8 against the outer edge of the rigid wall 1. Also, the peripheral edge of the diaphragm 2 is simultaneously clamped between the two edges of the walls 1 and 7. The rigid wall 7 has a central bore, through which a link 11 integral with the screw 5 passes, while a collar 9, of rubber or an elastomer, is held in place by a resilient ring 10, mounted on the wall 7 in the area which surrounds the bore, to enable the link 11 to slide with a minimum of friction while still ensuring a satisfactory tightness.

Through a bored fitting 12, the volume or space defined between the movable wall or diaphragm 2 and the rigid wall 7 can be placed in communication with the environment where the pressure prevails, which is to be measured, or, as an alternative on whose basis an adjustment is to be made.

The presence of the rigid wall 7, the retaining collar 9, the ring 10 and the bored fitting 12, obviously, is not vital to the ends of the present device: these components are not necessary in a case in which the surface of the movable wall 2 opposite to that on the side of the fixed wall 1 is already exposed to the pressure to be measured or to the pressure which should have an influence on the adjustment. In such a case, it will be sufficient that the absolutely tight clamping be ensured between the outer edge of the diaphragm and the outer edge of the rigid wall 1: also a resting base for a spring 13 should be provided.

FIG. 1 shows that, on account of the particular shape of the rigid wall 1 and of the movable wall (comprising the diaphragm 2 in the configuration it takes when no external forces are active thereon, and by the above mentioned rigid central element 3 integral with the diaphragm), the latter movable wall adheres, as it is being mounted, to the rigid wall 1, so that the volume of air present therebetween is at a minimum.

In FIG. 2, the device is complete, such as can be seen on completion of the assembly. In addition to the component parts above mentioned in connection with FIG. 1, there is shown the spring 13, which rests, at one end on a seat formed in the rigid wall 7 and, at the other end, on a cup 14 having a tapped hole. A nut 15, which locks the cup in any predetermined position relative to threaded end 16 of the link 11. An end piece 17, also threaded onto the end 16 is provided with an eye 18 for connection with the measuring or adjustment member concerned. A nut 19 is present for locking the end piece 17 relative to the end 16 in any preselected position. During assembly of the cup 14 in its correct position along the threaded link 16, the spring 13 is preloaded and the preloading is such as to overcome the force which results from the action of the ambient pressure on the movable wall. The latter is thus moved away of the fixed wall 1. In a volume or space 20, between the movable wall 2 and the rigid wall 1, the absolute pressure can be regarded, in practice, as being negligible if the volume of the space 20 is considerably large as compared with the volume of the air present between the movable wall 2 and the rigid wall 1 prior to mounting the spring. If, for example, the ratio of the volumes is 50, the absolute pressure in the cavity upon assembly is 0.02 atmospheres. In the particular device as shown in FIG. 2, the operative stroke of the link takes place as an extension of the stroke through which the link goes as it is being assembled. This means that the device is provided for being responsive to absolute pressures (as obtaining in cavity 21) which are below the atmospheric pressure (which obtains at the assembly): under such pressures, the spring 13 is extended and the movable wall 2 is shifted in such a direction as to cause an increase of the volume of chamber 20, while that of the cavity 21 is decreased.

Obviously, if the device is provided for being responsive to pressures above the atmospheric pressure at the assembly (which is carried out with an atmospheric pressure in the chamber 21), the volume or space 21 would be extremely reduced and would be increased as the absolute pressure is increased within the chamber 21 during operation, whereas the volume 20 would be decreased with respect to a very high initial value at assembly.

What is claimed is:

1. A device responsive to the absolute pressure of a fluid, comprising a first rigid wall of gas-impervious material, a second wall of gas-impervious material, said second wall having a non-deformable portion and a deformable portion, said first and second walls each having a peripheral portion, means securing said peripheral portions together in a seal tight manner, said second wall being movable relative to the first wall, the shape of the deformable portion of said second wall matingly adhering to the first wall then said first and second walls are secured at their peripheral portions so that the air volume present between said first and second walls is at a minimum, link means attached to said non-deformable portion of said second wall and extending beyond said second wall, and spring means operably connected to said link means, during operation of the device, to move said second wall away from said first wall to create a vacuum in the space between said walls whereby the surface of said second wall opposite the surface adhering to the first wall is responsive only to the magnitude of the absolute pressure of the fluid contacting such surface.

2. The device as claimed in claim 1 including a third rigid wall of gas-impervious material, said third rigid wall having a peripheral portion attached to the peripheral portions of the first and second walls in a seal tight manner by said securing means, said third wall having a configuration permitting said second wall to be moved away from said first wall, said link means passing through a seal tight aperture provided in said third wall, and means providing communication between the environment where the absolute pressure prevails and a space between said second and third walls.

3. The device as claimed in claim 2 in which said spring means is biased between an abutment on the link means and an abutment on said third wall, and said link means having an outer end provided with means for connecting the link means to a measuring or governing member.

* * * * *